United States Patent [19]

Bohrer et al.

[11] Patent Number: 4,555,939

[45] Date of Patent: Dec. 3, 1985

[54] CONDITION RESPONSIVE SENSOR FOR FLUID FLOW MEASUREMENT

[75] Inventors: Philip J. Bohrer, Minneapolis; Robert E. Higashi, Bloomington; Timothy L. Johnson, Minnetonka; Ernest A. Satren, Bloomington, all of Minn.

[73] Assignee: Honeywell Inc., Minneapolis, Minn.

[21] Appl. No.: 590,673

[22] Filed: Mar. 19, 1984

[51] Int. Cl.⁴ ............................................. G01F 15/14
[52] U.S. Cl. ............................................ 73/198; 73/273
[58] Field of Search .................. 73/23, 23.1, 204, 272, 73/273, 198

[56] References Cited

U.S. PATENT DOCUMENTS

| 1,972,054 | 8/1934 | Moller . | |
| 2,709,365 | 5/1955 | Piety . | |
| 3,149,941 | 9/1964 | Barnitz et al. | 73/23.1 |
| 3,251,225 | 5/1966 | Luft | 73/204 |
| 3,559,482 | 2/1971 | Baker et al. | 73/202 |
| 3,971,247 | 7/1976 | Rodder | 73/204 |
| 4,041,757 | 8/1977 | Baker et al. | 73/202 |
| 4,222,277 | 9/1980 | Kurtz et al. . | |
| 4,471,647 | 9/1984 | Jerman et al. | 73/23 |
| 4,491,024 | 1/1985 | Miller, Jr. | 73/204 |

OTHER PUBLICATIONS

Angell et al., "Silicon Micromechanical Devices" in Scientific America, 4/83, pp. 44–55.

*Primary Examiner*—Herbert Goldstein
*Attorney, Agent, or Firm*—Alfred N. Feldman

[57] ABSTRACT

A condition responsive sensor is provided with a flow sensor channel means that is interconnected to a capillary tube restriction. The capillary tube restriction can be readily interchanged on the device to change the response of the condition responsive sensor. A very small flow sensor is placed in the flow sensor channel. The flow sensor channel and the capillary tube restriction can be placed generally parallel to one another to reduce the overall length of the device.

9 Claims, 4 Drawing Figures

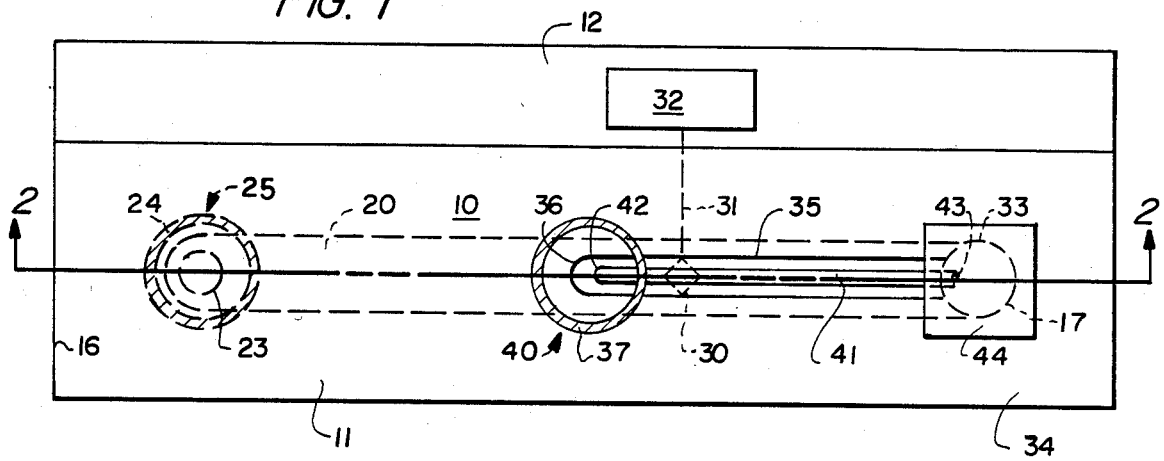
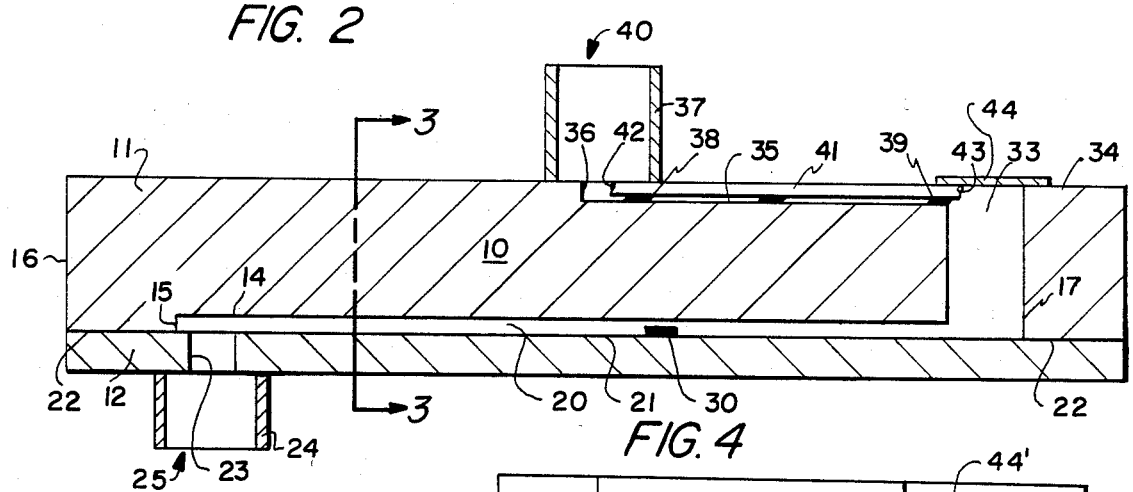
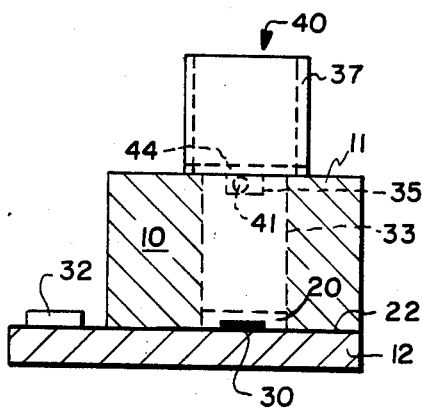
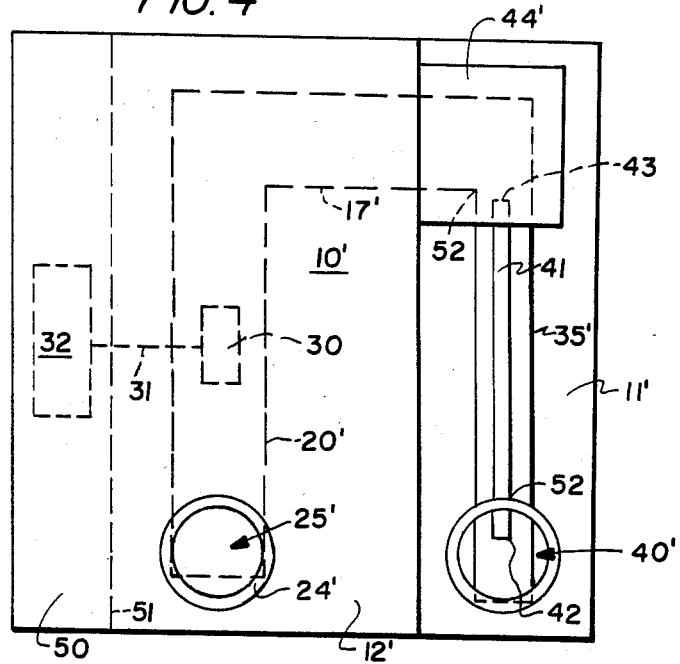

CONDITION RESPONSIVE SENSOR FOR FLUID FLOW MEASUREMENT

BACKGROUND OF THE INVENTION

The measurement of fluid flow has been an important function in many applications, and for many years. As such, numerous types of fluid flow sensing units have been developed. Typically, these units are rather large and the units are individually designed for a particular application.

In very recent years miniature electronic types of flow sensors have been developed. These flow sensors are very sensitive and are exceedingly small. These types of sensors can be manufactured by processes comparable to the manufacture of integrated circuits. This allows for the very small size, and the mass production of very inexpensive sensor elements. These units typically have been used in customized condition responsive sensors, or flow sensing applications, where each sensor structure was individually manufactured for a particular flow sensing application. While the flow sensor elements themselves have become relatively cheap, uniform, and small, their application has been rather cumbersome.

SUMMARY OF THE INVENTION

In order to utilize the recently mass-produced, miniature sensors, it became apparent that some form of small, and mass-producible housing had to be developed. However, the development of the housing normally had to be tailored for each individual application. In the present invention, a substantial amount of the housing is of uniform structure, but the housing can be modified in a simple manner to make the overall condition responsive sensor applicable to numerous different types of flow sensing.

The present invention is accomplished by providing a housing that has a generally rectangular fluid flow sensor channel. The channel can, however, be of any shape cross-section. The channel has mounted within it a miniature flow sensor. The channel is then adapted to be connected to a capillary tube that acts as a restriction. The capillary tube allows for a highly controlled rate of flow through the device for a particular application, and the less restrictive series connected flow channel in which the sensor is mounted provides for a practical sensing device. The present device is capable of providing a practical means for converting a small differential pressure (in the order of 0.001 to 10.0 inches of water) to a well-controlled, low flow rate. This low flow rate is then directed across the miniature sensor in a reliable manner. Thus, an electrical output from the flow sensor can be derived that corresponds to the flow rate through the device. The device can be calibrated in terms of a differential pressure, or in terms of flow rate through the device.

In accordance with the present invention there is provided a condition responsive sensor adapted to be connected across a source of fluid pressure differential, including: body means and base means with said means defining flow sensor channel means; said flow sensor channel means including first port means; flow sensor means mounted in said flow sensor channel means; said body means and said base means further defining reentrant flow channel means connected to said flow sensor channel means remote from said first port means; capillary tube restriction means having a first end of said capillary tube restriction means sealed in a fluid tight relationship to said reentrant flow channel means; and a second end of said capillary tube restriction means sealed at second port means to form a complete fluid flow passage through said condition responsive sensor.

Further in accordance with the present invention there is also provided a condition responsive sensor adapted to be connected across a source of fluid pressure differential, including: base means having first port means; said base means supporting flow sensor means; body means including a first side adjacent said base means and a second side remote from said base means; said base means further having reentrant flow channel means connected between said first and second sides of said body means; said base means and said body means forming flow sensor channel means connecting said first port means to said reentrant flow channel means to cause any fluid flow in said condition responsive sensor to pass over said flow sensor means; capillary tube restriction means placed on said second side of said body means with a first end of said capillary tube restriction means sealed in a fluid tight relationship to said reentrant flow channel means; and a second end of said capillary tube restriction means sealed at second port means to form a complete fluid flow passage through said condition responsive sensor.

Also in accordance with the present invention there is provided a condition responsive sensor adapted to be connected across a source of fluid pressure differential, including: base means having first port means; said base means supporting flow sensor means; body means including a first side adjacent said base means and a second side remote from said base means; said body means having recess means formed into said second side; said base means further having reentrant flow channel means connected between said first and second sides of said body means; said base means and said body means forming flow sensor channel means connecting said first port means to said reentrant flow channel means to cause any fluid flow in said condition responsive sensor to pass over said flow sensor means; capillary tube restriction means placed in said recess means in said second side of said body means with a first end of said capillary tube restriction means sealed in a fluid tight relationship to said reentrant flow channel means; and a second end of said capillary tube restriction means sealed in said recess means at second port means to form a complete fluid flow passage through said condition responsive sensor.

Further in accordance with the present invention there is provided a condition responsive sensor adapted to be connected across a source of fluid pressure differential, including: body means and base means with said means defining flow sensor channel means; said flow sensor channel means including first port means; flow sensor means mounted in said flow sensor channel means; capillary tube restriction means having a first end of said capillary tube restriction means sealed in a fluid tight relationship to said flow sensor channel means; and a second end of said capillary tube restriction means sealed at second port means to form a complete fluid flow passage through said condition responsive sensor.

BRIEF DESCRIPTION OF THE DRAWINGS

FIG. 1 is a top view of a complete condition responsive sensor;

FIG. 2 is a cross-section of FIG. 1 along lines 2—2;

FIG. 3 is a cross-section of the device of FIG. 2 along lines 3—3; and;

FIG. 4 is a top view of a second embodiment of a condition responsive sensor.

DESCRIPTION OF THE PREFERRED EMBODIMENTS

In FIGS. 1, 2, and 3 there are disclosed three views of a condition responsive sensor generally indicated at 10. The condition responsive sensor 10 has a body means 11 and a base means 12. The body means 11 could be conveniently constructed from a block of nonconductive material, such as plastic. The base means 12 can by any type of flat member, and in the present disclosure typically would be part of a printed wiring board. The body means 11 contains a rectangular recess 14 that extends from a point 15 near an end 16 of the condition sensor means to a second end 17. The rectangular channel 14 forms three walls of a flow sensor channel means generally indicated at 20. The fourth wall of the flow sensor channel means 20 is provided by the surface 21 of the base means 12. The body means 11 and the base means 12 are joined at a common surface 22 by any convenient technique such as a cement or could be mechanically held together by screws, rivets, etc. (not shown).

Near the end 16 of the body means 11 is an opening 23 in the base means 12. The opening 23 typically would be a hole which was near the end 15 of the flow sensor channel means 20. Encircling the hole 23 is a tube 24 that acts as an input-output port for the device. The hole 23 and the tube 24 provide generally a first port means 25 for the device.

Mounted on the surface 21 of the flow sensor channel means 20 is a flow sensor means 30. The flow sensor means 30 is a miniature fluid flow sensing element and could be manufactured by various known technologies. The present device envisions that the flow sensor means 30 would be a device integrated in a manner similar to an integrated circuit in a silicon substrate.

Since the flow sensor means 30 is mounted on the base means 12, which could be a printed wiring board, it can be connected by connection means 31 that could be in turn printed wiring connections to an electronic package disclosed at 32. The electronic package 32 provides an electrical output from the flow sensor means 30 and is of conventional design. It is handy to mount the electronic package 32 on the base means or printed wiring board 12, and to utilize printed wiring techniques for the connection means 31 to in turn manufacture a basic part of the condition responsive sensor 10 as a compact device.

The flow sensor channel means 20 is terminated at a hole 33 that acts as a reentrant flow channel means to connect the flow sensor channel means 20 to a second side 34 of the body means 11. The second side 34 of the body means 11 has a recessed means 35 cut into it between the reentrant flow channel means 33 and an end 36 which is encircled by a tube or pipe 37. The end 36 of the recess means 35 and the pipe 37 form a second port means 40 for the condition responsive sensor 10.

The condition responsive sensor 10 is completed by the insertion of a capillary tube restriction means 41 which is a short length of capillary or small diameter piping. The capillary tube restriction means 41 has an end 42 that is sealed at 38 within the second port means 40, and a second end 43 that is sealed at 39 under a plate 44 that covers the reentrant flow channel means 33.

With the device disclosed in FIGS. 1, 2, and 3 a condition responsive sensor has been disclosed which is capable of being connected across a source of fluid pressure by the first port means 25 and the second port means 40 so that a fluid will flow between these port means. The particular direction is not critical, and the present device can be used as a differential flow responsive element. It will be understood that a flow is restricted by the capillary tube restriction means 41 so that the amount of fluid flow is limited. The limited flow is coupled by the reentrant flow channel means 33 to the flow sensor channel means 20 where the flow occurs over the flow sensor means 30. This flow is distributed in a relatively large cross-sectional area of the flow sensor channel means 20.

The present device is capable of being manufactured in mass with only the capillary tube restriction means 41 requiring selection for the application of the particular device to different fluid pressures and fluid elements. The capillary tube restriction means 41 can be readily selected in size so as to adjust the condition responsive sensor 10 to different applications. Also, the present device utilizes a U-shaped configuration of the flow sensor channel means 20 with respect to the capillary tube restriction means 41, thereby reducing the total length of this device so that it has the ability to be applied in numerous applications where physical size must be limited.

The disclosures in FIGS. 1, 2, and 3 are of a device wherein the flow sensor channel means and the capillary tube restriction means are on opposite sides of the body means 11. This configuration provides the U-shaped, compact arrangement. The flow sensor channel and capillary tube could also be physically positioned in series rather than in parallel, although this would result in a longer device. Any physical configuration will suffice, as long as the pneumatic connection is serial. In FIG. 4 this same compact arrangement is accomplished by placing the flow sensor channel means and the capillary tube restriction means on the same side of the body means. FIG. 4 will be explained in detail utilizing reference numbers that are selected for correspondence with FIGS. 1, 2, and 3.

In FIG. 4 the condition responsive sensor 10' has a body means 11' and a base means 12'. A first port means 25' is provided with a tube 24' connected to a rectangularly formed flow sensor channel means 20'. The flow sensor channel means 20' is formed into the body means 11' and/or the base means 12' in any convenient manner. The body means 11' and the base means 12' are again cemented together or clamped together in any convenient means. A flow sensor 30 is placed in the flow sensor channel means 20' and is connected by circuitry 31 to an electronic package 32 that is disclosed as mounted on the base means 12' in an area 50 that is shown over-hanging an edge 51 of the base means 11'.

The flow sensor channel means 20' is connected to a reentrant flow channel means 17' that in turn is covered by a plate 44'. The reentrant flow channel means 17' connects at 52 to a first end 43 of a capillary tube restriction means 41 which again is placed in a recess 35'. The recess 35' is terminated at a second port means 40' where a second end 42 of the capillary tube restriction means 41 is disclosed. The end 42 of the capillary tube restriction means 41 is sealed at 52 so that the second port means 40' along with the recess means 35' and the end 42 of the capillary tube restriction means 41 is fluid tight.

In the device disclosed in FIG. 4 all of the fluid paths are on the same side of the condition responsive sensor 10' and are again interconnected in a U-shaped configuration to save overall length of the device. The capillary tube restriction means 41 can be conveniently selected with this structure to match the particular application, as was done with the device disclosed in FIGS. 1, 2, and 3.

As it can be seen, the specific physical structure of the body means and base means utilizing the flow sensor channel means, and the capillary tube restriction means can be altered to provide different configurations that are still within the scope of the contemplated invention. Since the details of the physical arrangement of the capillary tube restriction means and the flow sensor channel means, along with the reentrant flow channel means can be altered, the applicants wish to be limited in the scope of their invention to the scope of the appended claims.

The embodiments of the invention in which an exclusive property or right is claimed are defined as follows:

1. A condition responsive sensor adapted to be connected across a source of fluid pressure differential, including: base means having first port means; said base means supporting flow sensor means; body means including a first side adjacent said base means and a second side remote from said base means; said body means further having reentrant flow channel means connected between said first and second sides of said body means; said base means and said body means forming flow sensor channel means connecting said first port means to said reentrant flow channel means to cause any fluid flow in said condition responsive sensor to pass over said flow sensor means; capillary tube restriction means placed on said second side of said body means with a first end of said capillary tube restriction means sealed in a fluid tight relationship to said reentrant flow channel means; said capillary tube restriction means located on said second side of said body means adjacent to and generally parallel to said flow sensor channel means so that a total length of said condition responsive sensor is minimized; and a second end of said capillary tube restriction means sealed at second port means to form a complete fluid flow passage through said condition responsive sensor.

2. A condition responsive sensor as described in claim 1 wherein said capillary tube restriction means is a capillary tube which can be selected in size to cause said capillary tube and said flow sensor channel means to create a desired fluid flow through said condition responsive sensor.

3. A condition responsive sensor as described in claim 2 wherein circuit means including connection means are mounted upon said base means; said connection means connecting said circuit means to said flow sensor means.

4. A condition responsive sensor as described in claim 3 wherein said flow sensor channel means is large in cross-section compared to said capillary tube.

5. A condition responsive sensor adapted to be connected across a source of fluid pressure differential, including: base means having first port means; said base means supporting flow sensor means; body means including a first side adjacent said base means and a second side remote from said base means; said body means having recess means formed into said second side; said body means further having reentrant flow channel means connected between said first and second sides of said body means; said base means and said body means forming flow sensor channel means connecting said first port means to said reentrant flow channel means to cause any fluid flow in said condition responsive sensor to pass over said flow sensor means; capillary tube restriction means placed in said recess means in said second side of said body means with a first end of said capillary tube restriction means sealed in a fluid tight relationship to said reentrant flow channel means; and a second end of said capillary tube restriction means sealed in said recess means at second port means to form a complete fluid flow passage through said condition responsive sensor.

6. A condition responsive sensor as described in claim 5 wherein said capillary tube restriction means lie in said recess means on said second side of said body means adjacent to and generally parallel to said flow sensor channel means so that a total length of said condition responsive sensor is minimized.

7. A condition responsive sensor as described in claim 6 wherein said capillary tube restriction means is a capillary tube which can be selected in size to cause said capillary tube and said flow sensor channel means to create a desired fluid flow in said condition responsive sensor.

8. A condition responsive sensor as described in claim 6 wherein circuit means including connection means are mounted upon said base means; said connection means connecting said circuit means to said flow sensor means.

9. A condition responsive sensor as described in claim 8 wherein said flow sensor channel means is large in cross-section compared to said capillary tube.

* * * * *